July 12, 1966    J. H. LEMELSON    3,259,958
AUTOMATIC PRODUCTION MACHINE
Filed Oct. 22, 1965    6 Sheets-Sheet 1

INVENTOR.
Jerome H. Lemelson

July 12, 1966  J. H. LEMELSON  3,259,958
AUTOMATIC PRODUCTION MACHINE
Filed Oct. 22, 1965  6 Sheets-Sheet 3

INVENTOR.
Jerome H. Lemelson

July 12, 1966 J. H. LEMELSON 3,259,958
AUTOMATIC PRODUCTION MACHINE
Filed Oct. 22, 1965 6 Sheets-Sheet 4

*INVENTOR.*
Jerome H. Lemelson

July 12, 1966  J. H. LEMELSON  3,259,958
AUTOMATIC PRODUCTION MACHINE
Filed Oct. 22, 1965  6 Sheets-Sheet 5

INVENTOR.
Jerome H. Lemelson

Fig. 14

United States Patent Office
3,259,958
Patented July 12, 1966

3,259,958
AUTOMATIC PRODUCTION MACHINE
Jerome H. Lemelson, 85 Rector St., Metuchen, N.J.
Filed Oct. 22, 1965, Ser. No. 501,654
19 Claims. (Cl. 29—26)

This invention relates to an automatic tool and control system therefore and is a continuation-in-part of application Serial Number 477,467 for Automation Devices which was filed on December 24, 1954, now abandoned, and application Serial Number 294,010 filed July 10, 1963, now abandoned, a continuation thereof.

The conventional production machine tool employing an indexable turret or mount for a plurality of tools has been used primarily to position by indexing a plurality of cutting devices which remain stationary or move with the turret relative to a rotating fixture containing the work. The turret device is relatively inflexible in that, manual means are required to vary the settling position or adjustment of the tools on the turret in order to vary their attitude and the manner in which they perform work operations. While the turret itself may be moved relative to the work, its positioning has heretofore been dependent on the manual adjustment of stops or the like to control movement of the turret towards and away from the work and operations, such as drilling or turning have heretofore been performed only by moving the work relative to the tool such as by rotating it in a chuck. Other operations to be performed on the work such as off-axis drilling, slotting, milling or the like require removal of the work and its placement in another machine. This invention provides production tooling including a turret mounting a plurality of tools and/or other devices associated directly or indirectly with manufacturing articles or assemblies, and an automatic controller which is operative to predetermine not only the position of the turret and devices mounted thereon but also the operation of said devices in performing predetermined operations on work in process. Certain other features are also presented for providing improvements in the operation of the tooling, its manipulation mechanism and its control means.

Accordingly, it is a primary object of this invention to provide an improved production apparatus for automatically operating on work in process.

Another object is to provide an improved turret design applicable to machine tools and the like for prepositioning a plurality of tools, work piece of the like.

Another object is to provide an improved production apparatus including a turret for a plurality of different tools and a variable automatic control means operable to predetermine both the spatial location and indexing of the turret.

Another object is to provide production apparatus including a tool turret of improved design, variable automatic control means therefore, and auxilliary apparatus associated with said turret or adjacent apparatus also controlled by said variable automatic control means.

Another object is to provide an improved metal cutting machine operative under the control of a pre-programmed recording which recording is also operative to sequentially control the flow of a cutting fluid at such intervals such that the fluid is only utilized during cutting or predetermined times in a machining cycle.

Another object is to provide an improved machine with a variable program control therefore which is also operative to control the flow of a fluid such as an air blast adapted to cooperate on a work piece with the operation of a tool.

Another object is to provide an automatic production apparatus including a movable support for a production tool which is selectively positionable relative to a guide means and is automatically clampable or retainable in predetermined selected positions in the travel.

These and other objects and advantages will become more apparent upon reference to the following description taken in connection with the accompanying drawings in which:

FIG. 1' is a partial view of a modified portion of the tool illustrated in FIG. 1 showing means for clampingly engaging and locking the tool carriage relative to a guideway or track;

While specific designs are provided herein for the tool holding turret and its mount or prepositioning fixture, it is to be understood that these tool arrangements are not intended to be limiting to the scope of the invention. For example, not only is the turret itself subject to a substantial degree of variation in shape, number of stations, type of tooling mounted thereon, mounting for said tooling, mode of operation including means for rotating or indexing the turret, but the mount and associated apparatus coupled to position the turret are also capable of being varied substantially from the scope of the invention. While an overhead track mounted manipulator is illustrated as the means employed herein for positioning the turret, any suitable mount may be utilized depending on the operational parameters of the tooling.

It is also noted that while tooling mounted on the turret is illustrated as a plurality of motor driven devices such as drills or the like operative to machine or cut the work, said tooling may also comprise or be replaced by various devices for seizing and releasing articles to be assembled with the work or otherwise worked on, inspection devices for measuring or detecting work variations, probes for locating or sensing one or more surfaces associated with the work or its retainer; fluid material or article delivering means.

Figures 1, 1A:
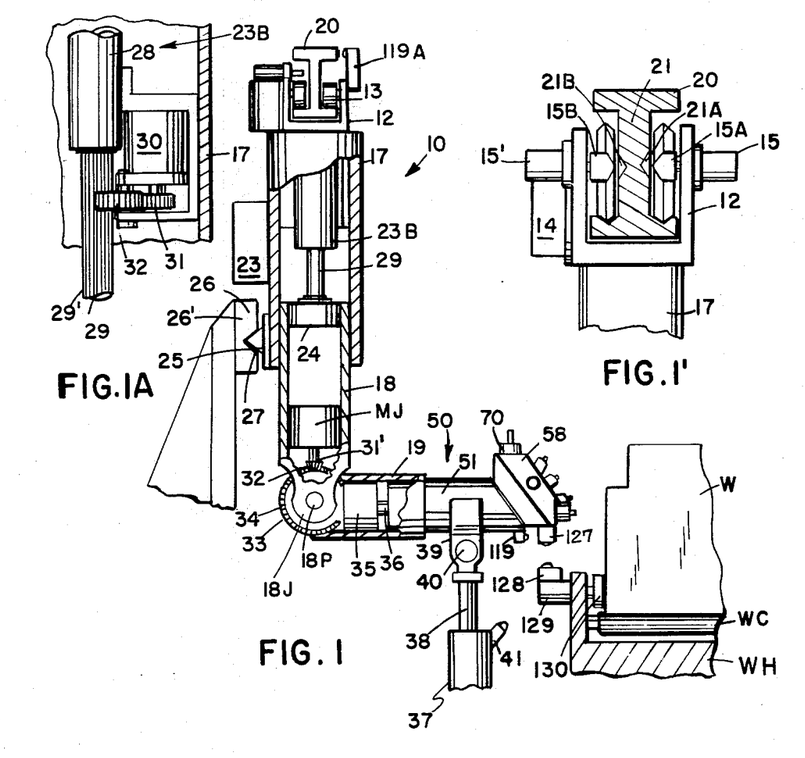
FIG. 1 is a side view with parts broken away for clarity of a production tool, mount for a work piece and associated control and positioning equipment.
FIG. 1A is a partial view of a lineal and rotary actuator utilized in the tool of FIG. 1.

There is shown in FIG. 1 an automatic machine tool operative for performing various operations on work in process and/or dimensional inspection of same. The tool comprises an overhead supported track or guide 20 for a fixture 10 comprising a carriage 12 having wheels 13 for moving 12 along guideway 20 and a reversible gear-motor 14 for power driving one or more of the the wheels to move 10 in either direction along 20. Notation 15 refers to a servo operated device mounted on 12 and operative for engaging a surface of 20 to lock the carriage 12 in a selected position while the device 10 is operating on the work. In FIG. 1' two locking devices 15 and 15', which comprise bistable solenoids, solenoid or servo motor operated mechanism are mounted on opposite side walls of the carriage 12. They operate simultaneously to engage wedge shaped nose members 15a and 15b of each in V-shaped mating surfaces 21z and 21b of the vertical wall 21 of track 21 as illustrated in FIG. 1' thereby assuring vertical alignment of the carriage 12 and its downwardly depending assembly with the guide-way 12. Thus, if the track 12, is referenced relative to a work-holding fixture WH and work W is in a referenced or predetermined position as held by WH, then the tool or tools depending from 12 will be referenced with respect to the work.

Depending downward from 12 is a first rigid column 17 which serves as a support and guide means for a second column 18 which is both slidably movable vertically within 17 and rotatable thereon about a vertical axis. A reversible drive unit 23 such as a gear-motor secured within 17 has an output shaft 23S mounting a plate or disc 24 secured to the upper end of 18 and is operative to both rotate and move column 18 up and down with respect to column 17.

The ability of column 18 to be vertically shifted relative to the shaft 23S of motor without disengagement therefrom permits it to be rotationally positioned by 23 while at any vertical position in its realm of movement. At the end of arm 18 is provided a mechanical joint 18–J about which a second arm 19 may pivot and is driven by a servo motor 30 and gear arrangement mounted within one of the arms 18 shown and illustrated in application Serial Number 477,467 in greater detail.

Secured to the end of column or arm 19 is a fixture 50 having a multiple tool assembly or turret provided at its end. The fixture, which will be described hereafter, may be provided in a number of different configurations operative for selectively positioning and operating different power devices such as tools, test apparatus, measuring or alignment probes, sensing relay or scanners.

Further alignment and steadying of the tool handling fixture 10 at the work station or location of the work holding fixture WH, is effected in FIG. 1 by means of a bucking bar or plate 26 which is supported in a fixed position on a base 27 which is secured either to the work holding fixture WH or the floor adjacent said fixture. A V-shaped groove or channel 26' provided in the side surface of 26 is adapted to be slidably engaged by a V-shaped bar 28 secured to column 17. When the apparatus 10 is positioned adjacent WH, retentive abutment of the way in the groove is effected by positionally or otherwise biasing the manipulation apparatus to compressively abut midway.

A motor MJ is shown mounted within the arm or column 19 and has an output shaft 31 which is operatively connected to gearing or a track arrangement for pivotally rotating 19 and the assembly secured thereto about the axis of pin 18' of the joint defined by a pin or shaft. Removably secured to the end of 19 is an arm assembly 50 at the end of which is mounted a turret 58 containing a plurality of power operated tools, probes, inspection devices of the like which may be prepositioned or rotated relative to arm 19 by the means hereinafter described for performing various operations on or relative to a work member positioned immediately adjacent the assembly 50. All of the servo motors and electrically controlled devices hereinabove described or associated with the turret including servo or motor operative for rotating and prepositioning the turret, or under the control of a variable sequential controller or positional computer 23 which is illustrated as being mounted on the upper column 17, although its location may be in any suitable position on the illustrated apparatus 10. In its simplest form, the controller 23 comprises an adjustable or presettable multicircuit timer having a plurality of outputs, each of which is connected or connectable to a respective of the described servo motors associated with 10 and/or one or more motors operative to move and preposition the work piece W on its mount or fixture WH. Such latter coupling may be affected during prepositioning of the tool relative to the mount WH or the work piece W by electrically connecting one or more jacks or probes mounted on and extending from a suitable portion of the apparatus 10 or the turret assembly at the end thereof.

Notation 26 refers to a portion of a column, stand or frame at the work station which is secured either to the floor or an extension of the work holding fixture WH and includes a V-block 26' having a wedge-shaped indentation 27 extending horizontally therein from one end of the block to the other such that a V-shaped extension or block 25 mounted on the upper column 17 of the tool 10 may engage therein and further preposition the tool assembly relative to the work holding fixture WH and work W which is clampingly retained thereby. As electro-magnet (not shown) mounted within or adjacent the block 26' may be utilized to the track, the ferro-magnetic wedge or block 25 or biasing engagement of 25 within cavity 27 may be used to effect surface to surface mating of the two members.

Figure 1B:
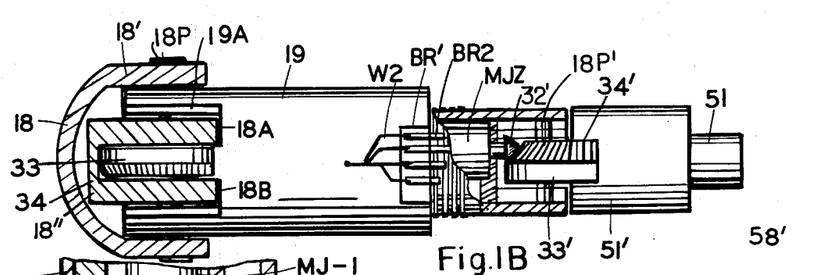
FIG. 1B is a plan view with parts broken away for clarity of a modified portion of the apparatus illustrated in FIG. 1.
Figure 1C:
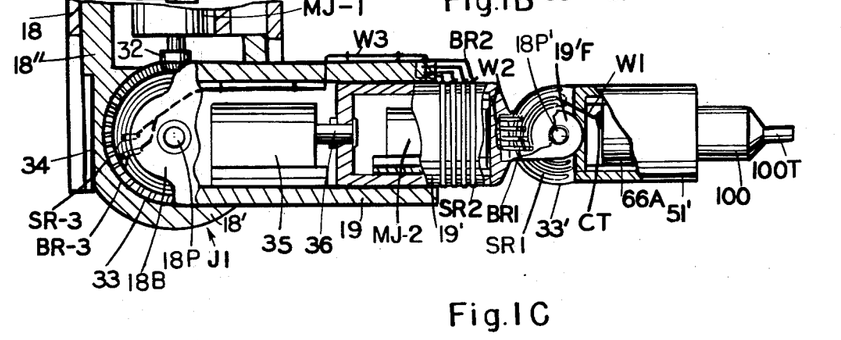
FIG. 1C is a side view with parts broken away for clarity, and modified, of the apparatus of FIG. 1B.

FIGS. 1B and 1C show further details of apparatus similar to the lower portion of the assembly of FIG. 1 but modified in such a manner that the turret or tool mounted at the end of the manipulator is further pivotably about an axis which may be rotated at the end of an arm which is extensible relative to the arm 19 of FIG. 1. In other words, the apparatus illustrated in FIGS. 1B and 1C is provided with two additional degrees of freedom so that the tool or turret may be positioned at substantially any attitude relative to an accessible work piece.

The vertically extending column 18 is shown reinforced with an internal liner 18" which liner not only reinforces the column but provides a yoke-like formation at the lower end thereof having fork-like leaves 18A and 18B which flank the ear plate 33 attached to and extending from the arm 19. Arm 19 is thus supported in bearing not only by the side walls 18' of column 18 but also by extensions of the liner 18". The motor MG–1 is thus mounted within the liner 18" and is supported thereby during the engagement of the bevel gear 32 with the gear teeth 34 of disc plate 33. The motor 35 mounted within column 19 is operative to rotate a second column 18' having fork-like leaves 19'F extending therefrom which provide bearing support for a third column 51' which may removably mount the column 51 hereinabove described, a lineal movable device 100 or other suitable tool. In other words, a motor 66A mounted within 51' may be operative to both rotate and linearly move either a turret 58' or tool 100 as hereinafter described.

A reversible gear motor J2 is mounted within arm 19' and is operative as described for pivotally rotating column 51' about the axis defined by pin 18P' extending between the fork leaves 19'F of column 19'. Spur gear 32' secured to the shaft of MJ engages teeth 34' cut in one edge of a gear plate 33' secured to 51'.

Electrical coupling between the devices mounted within column 51' and those mounted within columns 19' and 19, as well as those mounted within or beyond column 18 is effected by means of brush and slip-ring elements. The flat face of gear plate 33' is shown having a plurality of circular, flat strip conducting elements SR1 insulatedly secured thereto and insulated from each other when they are contacted during pivotal rotation of 51' about the axis defined by 18P', by means of respective brush elements BR1 insulatedly mounted near the end of column 19'. Wires W1 extend from electrical devices mounted on the turret and/or the motor 66A to respective of the circular flat strip conductors SR1 and other wires W2 extend from the brush elements BR1 to slip-ring elements SR2, which are insulatedly mounted on and circumscribe the column 19'. Brush elements BR2 are shown insulatedly mounted on a block BR' secured to the end column 19 and each make contact with a respective slip-ring SR2 during rotation of 19' relative to 19. Wires W3 extend from the brush elements BR2 respective further brush elements BR3 mounted at the other end of column 19 which engages respective circular flat strip conductors SR3 which are insulatedly mounted on a face of the gear plate 33 which defines means for rotating column 19 about the pin at the joint 11. Further wires (not shown) extend from respective of the circular flat strip conductors PR3 along column 18 and eventually are electrically connected to means for controlling the various servo motors mounted on or beyond column 19.

By employing mechanical and electrical-mechanical structures as illustrated in FIGS. 1B and 1C it is seen that various types of manipulative devices may be employed to position one or more turret mounted tools relative to a work piece and to effect the automatic control thereof by means of a computer or controller having output circuits which are electrically coupled or couplable to respective servo motors, solenoids or the like.

FIG. 1A illustrates further details of the lineal and rotary actuator 24, shown in FIG. 1 as being secured to the vertical column 17 and operative to both rotate and longitudinally position column 18. The actuator 24 comprises a first lineal motor or cylinder 28 secured within the housing 24 and operative to project and retract shaft 29 in accordance with a command or control input thereto. A rotary gear-motor 30 is mounted within and secured to the wall of housing 24 and has an output gear 31 secured to its shaft which drives a tooth gear 32 supported by the frame of the motor which engages longitudinal splines 29' provided in the shaft 29 of the lineal actuator 28. The shaft 29 is thus free to move vertically upward and downward when the ram of the cylinder motor 28 is projected and retracted, yet may be rotated when motor 30 operates when the teeth of the gear 32 engage in the grooves of the splines or teeth 29' cut in the ram or shaft 29 of 28. In other words, the teeth of gear 32 and 29 are operative to slidably engage each other when 29 moves longitudinally yet mesh to cause rotation of 29 as motor 30 operates. Since the end of 29 is secured to the plate or plug 24 which is pinned or otherwise secured to 18, lineal actuation of motor device 28 is operative to raise and lower 18 and rotary operation of motor 30 is operative to rotate 18 and the assembly secured thereto.

Further details of the apparatus illustrated in FIG. 1 include a circular gear plate 33 having bevel gear teeth 34 cut in the periphery thereof which are engaged by a bevel gear 32 secured to the end of the shaft 31 of the reversible gear motor MJ for rotation of the arm 19 about the pin or shaft 18' of the joint.

Shown mounted within the arm 19 is a lineal actuator of motor 35 having a shaft 36 secured to the end of arm 51 upon which is mounted the tool turret 58. Thus the turret base arm 51 may be moved longitudinally relative to the arm 19 for moving the turret and tools or devices mounted thereon, towards and away from the work to perform various operations thereon or relative thereto. The device 35 may also comprise a motor operative to both project and retract arm 51 as well as rotate said arm in the manner that the device 24 operates to both lineally and rotatably position AT.

Mounted within the other end of arm 51 is a servo motor operative to rotate the turret 58 at the end of 51. The tools mounted on the turret 58 may comprise various devices which will be described and which are electrically controlled and/or actuated.

All of the described electrically controlled servo devices mounted on or within the various arms or columns of the apparatus 10 of FIG. 1 are preferably electrically connected to switching control means mounted within the automatic controller or computer 23 by means of surface contacting electrical conductors and brushes or extensible electrical wires as illustrated in application Serial Number 477,467.

The notation 37 refers to a positioning and/or clamping means disposed in the immediate vicinity of the work holding fixture WH and having a projectable arm 38 with a clamping or positioning fixture 39 at the end thereof which is operative by means of a servo 40 to engage and retain the arm 51 of the manipulator assembly for steadying and prepositioning same while the turret is rotated and the tools or devices thereof operate on the work piece. Actuation of the lineal actuator or cylinder 37 may be automatically effected to project the clamping assembly 39 upward to engage a portion of the arm 51 when a sensing relay 41 mounted on or adjacent 37 senses the presence of the apparatus 10 and particularly the end of arm 51. Shown mounted on the turret 58 is a light source 127 which is operative to project a beam of light when the arm 51 and/or the turret 58 are prepositioned relative to the work holding fixture WH. The light from source 127 may be directed at the relay 41 which may be a photoelectric relay responsive thereto, by prepositioning the turret or arm 51 under control of the positional controller 23. The relay 41 when activated by light from source 27, may be operative to effect the automatic projection of the clamping head 39 upward which movement is arrested when said fixture engages 51, as illustrated, by means of a limit switch thereon or the light. After the turret and the tools mounted thereon have performed predetermined operations on the work, the light source 127 may be positioned and energized under the control of computer 23 to project a second beam of light at 41 which is responsive thereto and is operative to cause operation of servo 40 to unclamp head 39 from 51 and servo 37 to cause retraction of shaft 38 and removal of the automatic clamping fixture from the vicinity of the apparatus 10 so that said apparatus may be positioned or otherwise moved in accordance with a predetermined program.

Also illustrated in FIG. 1 is a power operated servo 129 which is coupled to a clamping device 130 for clampingly engaging and prepositioning the work on its fixture WH so that the tool may perform automatic operations thereon. Mounted on the top of servo 129 is a photoelectric relay 128 which may be energized to cause bistable operation of 129 for clamping and releasing the work when respective pulses of light from the light source 127 are directed at the light responsive element of 128.

The latter described means for communicating between the tool and the clamping means for retaining the tool in position or the clamping means for retaining and prepositioning the work on its fixture is internally under the control of the computer 23 mounted on the carrier and provides a substantial degree of flexible automation and communication between machines.

It is briefly noted at this point that by modulating the intensity of the light source mounted within 127 in accordance with signals received from a recording reproduced in the programming device 23, illustrated in FIG. 1 may be utilized to communicate between the machine tool 10 and other devices associated with prepositioning or otherwise operating on a work. For example, if the work is mounted on a conveyor WC, a turntable or other fixture which is driven by a servo motor, such servo motor may be controlled by signals generated in the computing device 23 or reproduced from a recording therein without the need for electrically connecting the output of 23 with the devices associated with the station.

In another form of the invention, a photoelectric relay including a photoelectric scanning cell such as 127 mounted on the turret or on any suitable location on the carrier fixture such as arms 19 or 51, may be utilized for scanning the surface of the work W or fixture WH for prepositioning the tool mount 50 or turret 58 relative thereto prior to performing one or more predetermined operations on said work. The photoelectric relay may include a light source adapted to project a beam of light in the direction of the work holding fixture as the photoelectric scanner is brought into the vicinity thereof. One or more reflective markers or mirrors positioned on the surface of the work or holding fixture may be utilized to reflect light back to the photoelectric cell when intercepted by said light beam which phenomenon is operative to energize the relay associated with the cell for providing a signal to effect stoppage of the motor or motors positioning the fixture and turret relative to the work.

If the turret or fixture mounted at the end of arm 51 contains one or more clamping devices or article seizing means adapted to hold and preposition an article relative to the work W for assembly therewith or relative to a machine tool adapted to operate on said member retained by said turret, then one or more signals generated by the controller 23 may be communicated to the work station by means of a light source such as 127 mounted on the carrier or turret and controlled or modulated by signals generated by the command computer 23. A pick-up such as 128 mounted at the work station may be utilized to generate output signals which are operative to control, in addition to clamping and positioning fixtures located at the work station, operation of one or more motors driving tools or other devices thereat for cooperating with the turret mounted devices in effecting an assembly of parts held thereby or for performing a predetermined operation or operations on work held by said turret or fixture. It is also noted that one or more of the devices 70 mounted on the front face of the turret may comprise light sources, photoelectric cells, limit switches or other sensing means which are selectively rotated into position under the control of the multi-circuit controller or computer 23 and utilized to sense the presence of the work, work holding fixture, marker or other means provided thereon for prepositioning the tool fixture 10 relative thereto or for effecting inspection operations on the work such as dimensional measurement, surface position, flaw detection, etc.

Figure 1D:
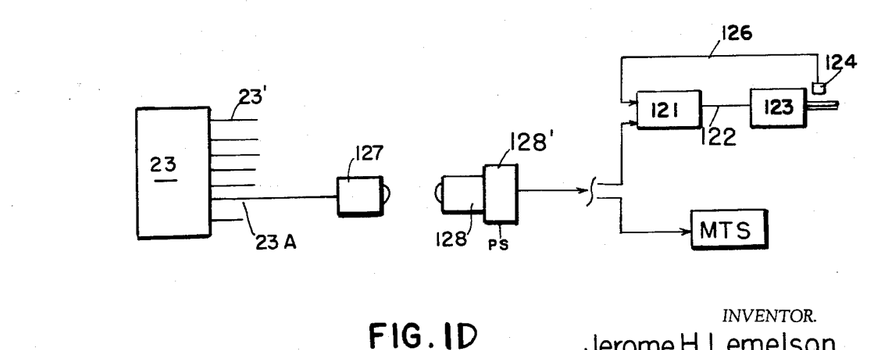
FIG. 1D is a schematic diagram showing means for communicating between a controller mounted on the tool and one or more servo devices positioned adjacent the tool but not operatively connected thereto.

Illustrated in FIG. 1D is a circuit diagram showing means for controlling one or more servos or solenoids located at the work station by utilizing signals generated by the controller 23 mounted on the carrier. As stated, the controller 23 may be operative to generate pulses or analog signals on a plurality of output circuits 23' thereof in a predetermined sequence for controlling the various servo motors associated with the carrier and turret mounted tools. One of said output circuits, denoted 23A is illustrated as extending to a light source 127 which, when aligned with the work station, as controlled by the signals generated on the other circuits of 23, communicates with a photoelectric cell 128 mounted at a predetermined location at the work station. The output of the photoelectric relay 128' associated with the cell 128 is connected to one or more electrical devices to be controlled thereby, two of which are illustrated. One of the devices is a servo motor 123 which is utilized to position the work station for performing on work held by the assembly 10. The output of 128' is an analog signal which varies in amplitude or intensity in accordance with the signal generated on the output 23A and is fed to a comparator device 121. The comparator device 121 also receives a feedback signal generated in accordance with the position or speed of the output shaft of motor 23 and generates a different signal on its output 122 which is fed directly to the control input of motor 123 for controlling said motor. Also shown as being connectable to the output of the photoelectric relay 128' is an electrically operated device MTS which may comprise a solenoid or motor which is triggered or operated by the signal generated on its output from the output of the photoelectric cell 128. Thus, when the device MTS is connected directly to the output 128, it will be operated whenever a signal is generated thereon, and may be utilized to clamp or unclamp the work, or perform various operations relative to the work, a tool, etc.

Figures 2, 3, 4, 5, 6, 7:
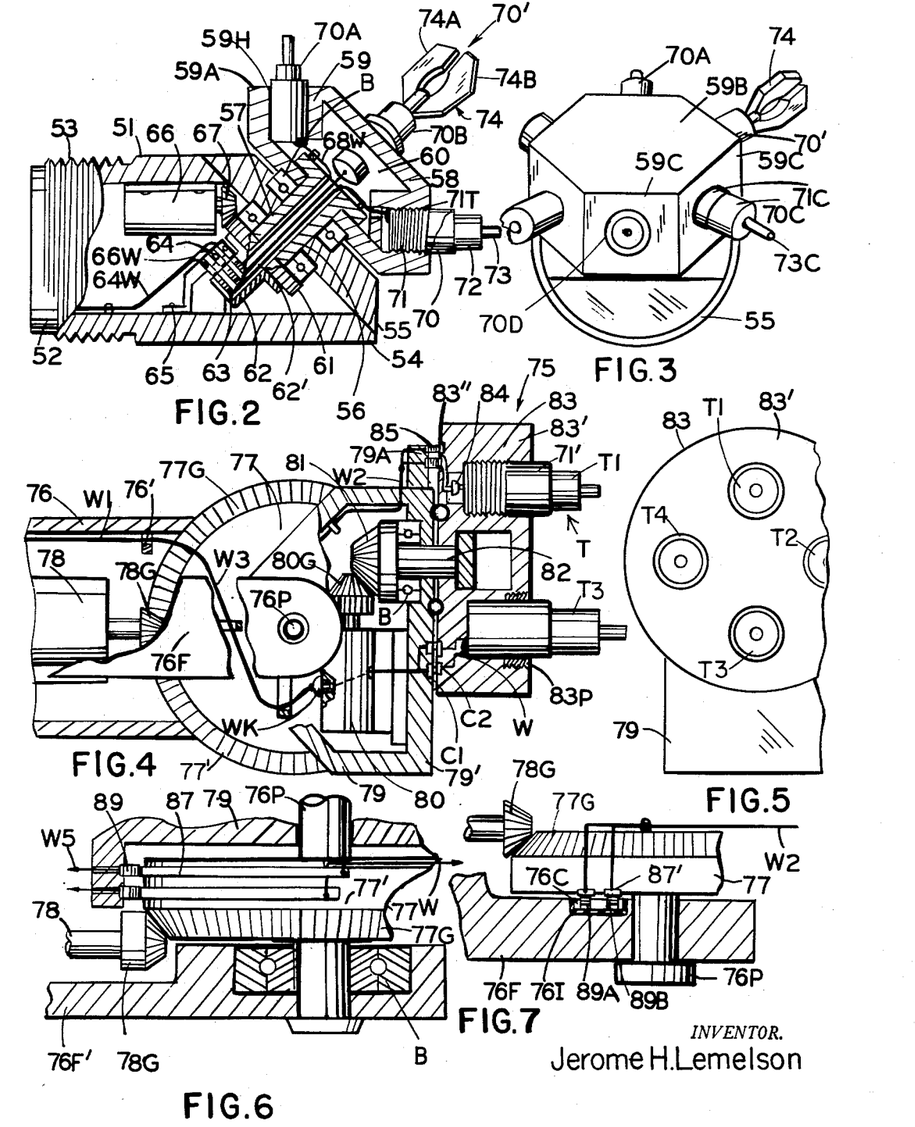
FIG. 2 is a side view with parts broken away for clarity of a tool or manipulator retaining turret applicable to the apparatus of FIG. 1.
FIG. 3 is an end view of the assembly illustrated in FIG. 2.
FIG. 4 is a partial side view with parts broken away for clarity of a modified type of turret and mount therefore applicable to the apparatus of FIG. 1.
FIG. 5 is a partial end view of the assembly of FIG. 4.
FIG. 6 is a partial view with parts broken away and sectioned of part of the apparatus of FIGS. 4 and 5.
FIG. 7 is a partial view of modified components utilized in the apparatus of FIG. 4.

FIGS. 2 and 3 illustrate further details of the turret assembly 50 shown in FIG. 1. The turret 58 is shown rotationally mounted adjacent the slanted end wall 55 of the arm attachment 51, the other end of which 52 is threaded at 53 for threadably securing and adjusting 51 within a threaded bore at the end of arm extension 19 as shown in FIG. 1. The end wall 55 is preferably inclined at 45° as to the longitudinal axis of 51 and is shown heavy enough to support a plurality of ball bearings B surrounding an opening normal to the surface of plate 55 in which is rotationally mounted and supported by said bearings a shaft 57 extending from the turret. At one end of 57 is provided a toothed gear 61 which is engaged by a gear 67 secured to the shaft of a gear-motor 66 which has electrically connected to a power supply through one or more switches of the timer or automatic sequential control at 23 by means of a wire 66W and rotary electrical slip-rings and brushes provided near the axis of the joint 18–J. Notation 62 refers to an extension of shaft 57 containing slip-rings 63 which are insulatedly mounted thereon and are engaged by brushes 64 provided on a stationary mount 65 including a bracket supported off the inside surface of the wall 54 of arm 51. A cable 64W has various wires connected to respective of these brushes 64 and is connected at its other end to a similar slip-ring-brush arrangement that the joint 18–J and an extensible cable or reel arrangement extending through the columns 17 and 18 to respective outputs of the automobile controller 23. The slip-rings 63 connected to respective wires 68W which extend through a bore 56 in shaft 57 to respective of the servo operated devices of the turret 58 which devices are referred to by the notations 70A, 70B, 70C, 70D, etc. Each of the power operated devices extend from housings 71 which are exteriorally threaded at one end to permit their removable retention in respective threaded holes 59H in different faces 59 of the turret which are denoted 59A, 59B, 59C, etc.

Each tool is shown as having a tool housing 72, end portion 73 which may comprise a probe, transducer, drill, mill or any suitable power operated device which is operative in one or more of several modes. For example, notation 72 comprises a rotatable motor which rotates tool 73 for drilling or otherwise performing a cutting operation on the work piece. This operation is controllable both as to time of operation and speed or rotation by the automatic controller or computer 23. The axis of the cutting tool 73 is so disposed that when the tool is positioned, as illustrated, for operating on a work piece by the correct alignment of the turret 58, its axis will be substantially parallel to, if not equal to, the longitudinal axis of the arm 51 and the axes of the other tools may be similarly positioned by correct rotation of the turret which may be accomplished by predetermined control of the turret drive servo motor 66 and/or an indexing mechanism.

Notation 60 refers to the hollow interior of the turret which may contain means for disconnectably connecting the control and power wires extending through the bore 56 in the shaft 57 to respective of the servo motors or power operated devices illustrated.

While the housings 71 which retain and preposition the various servo operated devices may be threaded and provided with locking means for prepositioning them within the bores 59H of the turret, other means may also be utilized such as set-screws, jam fits, and the like for removably securing said housings to the turret.

Several additional variations in the apparatus illustrated in FIGS. 1–3 are noted. The motor 66 mounted within the arm 51 for rotating the turret 58 may be substantially infinitely controllable in either or both directions for varying the degree of rotation of the turret in accordance with a predetermined program commanded by the controller 23 or may comprise a stepping motor operative to index the turret one tool position each time its input 66W is pulsed by a signal derived from said controller. In one form of the invention, indexing of the turret is such that the longitudinal axis of each tool will be substantially parallel to or aligned with the longitudinal axis of the arm or housing 51 so that longitudinal movement of said housing relative to its base 19 by means of a lineal servo or actuator will move the tool 73, so indexed, in a straight line towards and into the work thereby permitting such operations as drilling, milling, shaping, grinding, or the like, with precision.

If the turret rotating servo 66 is infinitely variable, depending on the control of the other servo motors comprising the tool carrier assembly 10, tools may be operated not only in the position of the tool 70 (i.e. aligned with the longitudinal axis of the housing 51), but in most any position or location relative to the work. For example, the tool 70A may be operative on a downwardly facing portion or wall of the work by movement of the housing 51 upward under said wall. Or, if the tool 70A is a grinding device or the like, movement of housing 51 in a direction parallel to its longitudinal axis may be utilized to bring the peripheral surface of the grinding tool against a vertical surface of the work.

A particular advantage derived in utilizing a turret arrangement of the type illustrated in FIGS. 2 and 3 in which a plurality of power operated devices, each containing its own servo motor or drive, are mounted on the turret, is noted in which it may be desired to rapidly bring each device to a predetermined or maximum speed just prior to indexing same to its work position so that when said work position is attained, it will not be necessary for the fixture to be delayed while the tool is accelerated. If the tool servo 72 is a speed variable motor and is reversible in its operation, these variables may be automatically controlled in a predetermined manner by the controller 23 to perform different operations on a work piece. Notation 70 which refers to a typical turret mounted tool provided in removable housing 71, may, in addition to comprising a rotary or lineally actuated tool, also comprise a tool which is both operable to rotate and move axially or lineally by means of separate motors mounted within the housing 71 which are respectively controllable both as to speed and degree of rotation by the automatic controller or computer 23 mounted on the carrier. Thus the base or arm 51 may be prepositioned and held stationary relative to a work piece while the operating portion or bit 73 of the tool is moved into or against the work and thereafter withdrawn. Devices 70 may also comprise any power operative means for supplying components or material to become part of the work piece operated on thereby such as means for delivering rivets, welding rod fasteners, coating material, adhesive, lubricants or the like. One more of the tools 70 may also comprise welding devices, inspection transducers or the like.

Shown at turret station or position 70B is an article manipulator assembly 74 comprising a pair of jaw members 74A and 74B operative to open and close against a work piece to be held thereby for the manipulation of said work piece during assembly or for performing other functions relative thereto or thereon resulting from the rotation of the turret 58 per se or in sequence with predetermined manipulative movements of the other components of the apparatus 10. In addition to being openable and closable between two limits or a degree as predetermined by signals generated by an automatic controller 23 and transmitted to the servo motor (not shown) mounted within the housing 70' which is secured at station 70F, the jaw assembly is preferably also rotatable about the longitudinal axis of the housing 70' by means of a further servo motor mounted therein to further increase the versatility of said manipulative device 74. One or more manipulative jaw assemblies as shown in my application Serial Number 477,467 may be provided on the turret at different tool positions or stations thereof as illustrated. In other words, the turret is designed to permit the removable assembly of a plurality of bases or mounts for any of a plurality of different tools, transducers, inspection or manipulative devices and any predetermined array of different or the same devices may be combined on a single turret depending on the particular functions to be performed on work in process.

FIGS. 4 and 5 illustrate another design for an automatic tool including a turret which is mounted on an arm which is applicable to the apparatus of FIG. 1 or variations thereof, in the manner that the tool assembly 50 was so applied. Most of the mechanical and controllable variations including tool arrangements described for the apparatus of FIGS. 2 and 3 are also applicable to the turret arrangement illustrated in FIGS. 4 and 5.

Turret assembly 75 is provided at the end of an arm 76 which is preferably removably secured to either of the arms 18 or 19 of FIG. 1. The turret 83 comprises a disc-shaped support 83' for a plurality of tools, manipulators or other devices as described which are referred to by the notations T1, T2, T3 and T4 and are each removably mounted in threaded or otherwise shaped bores extending partly through the turret about the rotational axis thereof as illustrated in FIG. 4. The turret 83 rotates on a shaft 82 supported by a ball bearing B which is supported at the end of a housing 79 which is secured to a gear plate 77 having gear teeth 77G and an axis of rotation defined by shaft or pin 76P which is supported by a pair of bar-like formations defining a yoke 76F which extends beyond the end of arms 76. A reversible gear motor 78 is shown mounted with the arm 76 and is controllable by power supplied through the respective switching circuits of the positional computer or controller 23 mounted on the manipulation apparatus as illustrated in FIG. 1. The output shaft of motor 78 mounts a bevel gear 78G which engages bevel gear teeth 77G in the gear plate 77 permitting the entire assembly 75 to be rotated and positioned between two angular limits defined by the extension of the gear teeth around the gear plate 77.

Secured to the gear plate 77 is a housing 79 the end wall 79' of which supports the shaft 82 on which the turret 83 rotates. A reversible gear-motor 80 mounted within the housing 79 has a bevel gear 80G secured to its shaft which engages a bevel gear 81 at the end of shaft 82 for rotating the turret 83 and indexing or positionably controlling said turret for bringing selected tools or devices T into alignment with different portions of a work piece positioned adjacent the turret. Electrical connection of the control inputs W1 to the various tools or devices mounted within the housings 71' at the various stations of the turret, is maintained by means of slip rings and brushes disposed concentrically around the shaft 82. Slip rings 83'' are shown insulatedly mounted on the rear face of the turret and are engaged by brushes 85 mounted on a projection or arm 79A which is insulatedly supported off the upper wall of the housing 79. Wires W2 extend from the brushes through the housing and connect to a slacked wire W3 which extends through the arm 76 and is electriaclly connected to the positional computer or controller 23 as described. In order to permit the turret and/or hosuing 79 to be removed and replaced for repair and tool changing functions, a disconnectable electrical connector WK is provided at the end of wire W3 for connecting all the circuits within the housing 79 and extending to the circuits mounted on the turret 83.

FIGS. 6 and 7 illustrate means for effecting an electrical connection between the arm 76 and the turret assembly 75 whereby the slack wire W3 is eliminated. One of the arms 76F' of the fork assembly at the end of 76 is illustrated as supporting a ball bearing B which rotationally supports the shaft 76P extending through a portion of the housing 79 to the other bar of the yoke (not shown). A gear plate 77 is fixably supported on shaft 76P and has a peripheral surface 77' which is substantially the surface of cylinder on which is insulatedly mounted a plurality of slip rings 87 which are respectively electrically connected to the servo motor 80 and those associated with each of the turret mounted electrically operated solenoids, or motors T or other devices operated by electrical energy gated from controller 23. Brushes 89 are insulatedly supported by a portion of the housing 79 and are connected by wires W5 to the output of the computer 23.

In FIG. 7, the gear plate 77 is shown having a plurality of electrical wipers or brushes 87' insulatedly supported on a face thereof which is adjacent the inside face of the yoke arm 76F. Slip rings 89A, 89B, etc. are mounted in a channel in an insulating washer or plate 76I secured within a channel provided in the inside face of arm 76F and concentric with the axis of rotation of the assembly including 77. The brushes are electrically connected via wires W2 to respective of the electrically operated devices mounted on the rotatable turret and wires (not shown) extend from the slip rings 89A, 89B either directly to respective outputs of the automatic controller 23 or to further rotary coupling means such as those provided at the one or more joints of the manipulator. Thus, as selective of the outputs of the controller 23 become energized, electrical energy is passed through the brush-slip ring connections to predetermined of the electrical devices mounted on the turret which are respectively energized and operated thereby.

If the motor 78 which positions the turret assembly 75 is substantially infinitely variable or variable throughout very small increments of its rotation, then it is seen that the turret may be substantially infinitely positionable to permit positioning of selected of the various tools or electrical devices mounted thereon in most any attitude about the axis defined by shaft 82 and the apparatus may be operated with a substantially greater degree of flexibility than the conventional machine turret apparatus employing a turret which can only be indexed to predetermined positions in its location (i.e. one position per station or tool).

Figure 8:
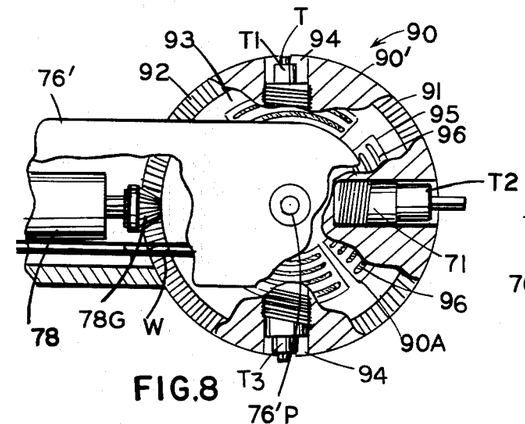
FIG. 8 is a side view with parts broken away for clarity of a modified type of turret applicable to the apparatus of FIG. 1.
Figure 9:
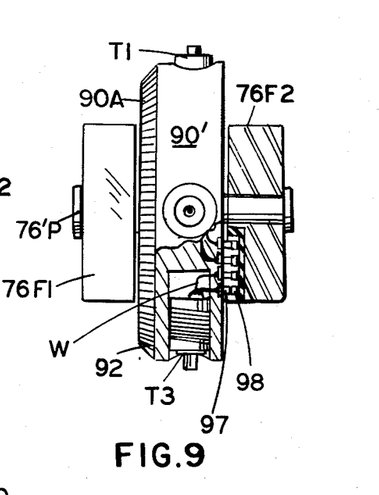
FIG. 9 is an end view of the apparatus of FIG. 8 with parts broken away for clarity.

FIGS. 8 and 9 illustrate still another design for a power operative turret applicable to the apparatus of FIG. 1 or variations thereof for prepositioning a plurality of tools, inspection transducers, maniplator devices, or the like, as described. The turret assembly 90 comprises a base 90' which is substantially a large, cylindrically shaped disc having bevel gear teeth 92 cut or otherwise provided in one face thereof for engagement by a small bevel gear 78G which is driven by a reversible gear motor mounted within the arm 76'. One end of said arm 76' is secured to either of the columns 18 or 19 of the apparatus of FIG. 1 while the other end defines a yoke having bar-like leafs 76F-1 and 76F-2, each of which support a shaft 76'P which extends through the turret base 90' for rotation of said base about the axis of said shaft. The various tools or devices T are removably secured within radially extending bores or holes 94 which terminate around the periphery of the cylindrical portion of the base 90'. Said power operated devices, referred to by the notations T1, T2, T3, etc. may be rotationally operative and/or movable in and out of the openings of the turret for performing different operations on a work piece or assembly positioned in alignment with said turret.

One face 90A of the turret base 90' is shown having a plurality of printed circuit boards 95 mounted thereon, each of which is provided with a plurality of arc-shaped flat circuit elements 96 which electrically connect to respective of the servo motors or electrical devices associated with each of the turret power operated devices mounted within the removable housing 71 at the respective stations. The arcuate elements 96 of one circuit board extend along concentric circular paths which are extensions of the paths of respective elements on adjacent circuit boards so that a single electrical brush element of a bank 97 of said element mounted on one of the leaf elements of the yoke will be slidably connected to a respective circuit element associated with a particular tool when said tool is rotated into a working position but will not be connected to a circuit element associated with adjacent tools until said adjacent tools are similarly positioned. In other words, by insulating portions of slip-ring-like elements, and utilizing one brush to connect a particular servo of each of the power operated devices T with a channel of the control computer 23, the circuit arrangement of both said computer and those circuits coupleable therefrom to the various servos of the turret is substantially simplified, since one channel of 23 extends to different tool servos.

Figure 10:
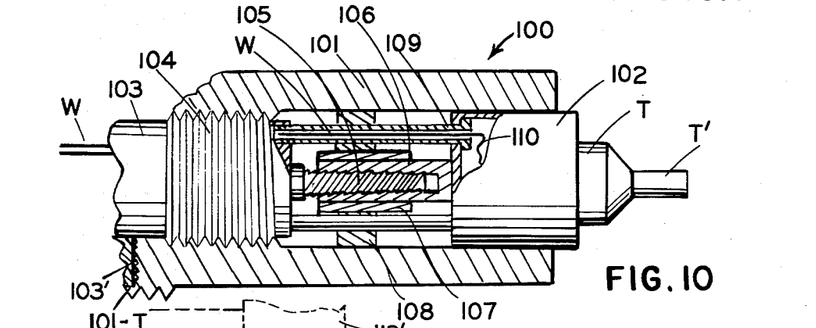
FIG. 10 is a partial side view with parts broken away for clarity of a tool applicable to the apparatus of FIGS. 2 and 8.

In FIGS. 10 is shown a tool arrangement applicable to any of the turret positions hereinabove described. In other words, the assembly 100 is provided with means for removably securing said tool in any of the turret locations by means of pinning, set screws or externally threading and locking the housnig 101 in position. Removably secured within housing 101 is a second housing 102 for a power operated tool T and includes one or more servo motors for operating said tool, the extension T' of which may comprise a drill, mill, grinder, transducer, manipulation device or the like as described. A first, reversible gear motor is mounted within a housing 103 which is exteriorly threaded at 104 to permit it to be removed from one end of housing 101 and is held in position by means of a set screw or pin, noted 103'. The exterior surface of housing 101 is threaded at 101T to permit its adjustment and removal from the threaded hold of the turret. The output of the motor mounted within sub-housing 103 is coupled to a long threaded shaft 105 which is operative when turned to longitudinally move a second shaft 106 which is secured to the end of housing 102. The shaft 106 is slidably engageable in a long bearing 107 which slidably engages the shaft during its longitudinal movement therein. The bearing 107 is supported by a plate 108 secured to the wall of housing 101. A long tubular member 109 is secured to housing 102 and slides in and out a bore in housing 103. Extending through said tubular member is a cable 110 connecting wires extending to housing 103 to the various servos or motors mounted with 102. Thus the motor mounted within 103 may utilized to slide housing 102 longitudinally through the bore 101B in the housing 101 while signals controlled by the positional controller 23 may be transmitted to the servos operating the tool regardless of the position of the housing 102 thereof.

Figure 11:
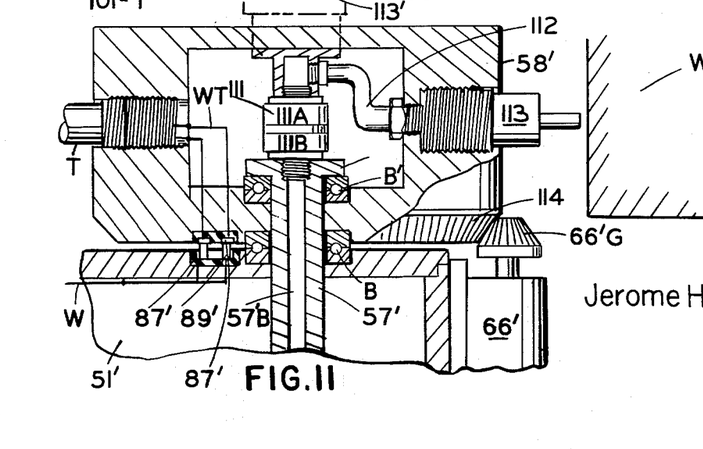
FIG. 11 is a side view with parts broken away for clarity of a modified type of turrent employing fluid pressure coupling means for power operating one or more tools mounted thereon.

FIG. 11 illustrates an arrangement whereby the hereinabove described turrets may be modified to mount various servo devices which may be fluid power operated as well as electrically controlled. The base or arm 51' provides support for a ball bearing B and a shaft 57' is having a bore 57'B extending therethrough for the conduction of hydraulic or pneumatic fluid. The other end of shaft 57' is supported by a second ball bearing B' within the hollow interior of the turret housing 58' and mounts a rotary fluid coupling 111 of conventional design for connecting one or more fluid lines 112 with respective fluid operated servo devices such as 113 provided at one or more of the turret work stations. Device 113 is shown positioned about the peripheral surface of the turret although one or more fluid operated devices may also be provided around the front face of the turret as illustrated at 113' and may be connected to the portion 111a of the fluid coupling 111 which remains fixed relative to the turret and rotates therewith.

One face of the turret housing 58' is shown machined with bevel gear teeth 114 which are provided radially about the axis of the hollow shaft 57'. A servo motor 66' controlled by said positional controller 23 has a bevel gear 66'G engaging the teeth 114 for rotation of said turret. A second electrically operated tool or inspection device T is shown at a second turret position and is electrically connected to wires W which are coupled to the controller 23 by means of a slip ring and brush arrangement 89' provided as hereinabove described.

Figure 12:
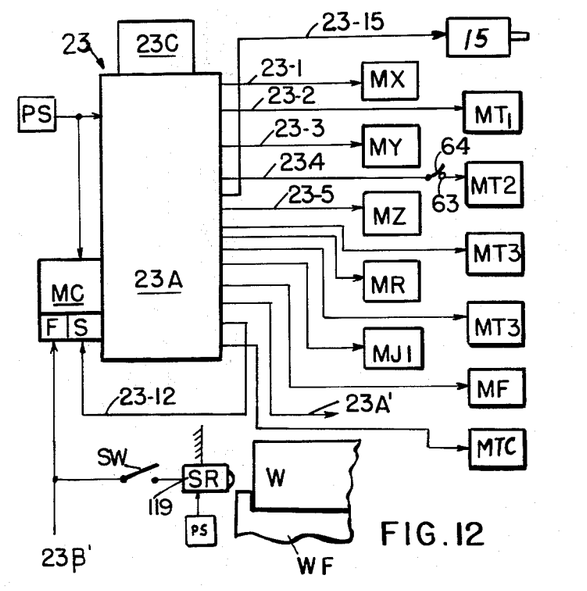
FIG. 12 is a schematic diagram showing one form of programmable automatic control means applicable to the apparatus of FIGS. 1–11.
Figure 13:
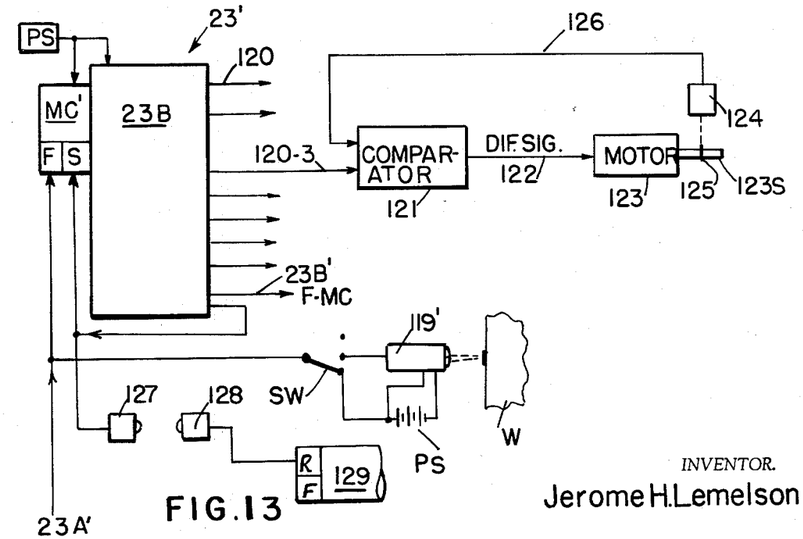
FIG. 13 is a schematic diagram showing another form of programmable automatic controller applicable also to the apparatus of FIGS. 1–11.

FIGS. 12 and 13 are schematic block diagrams illustrating programmable controllers operative to effect one or more predetermined control cycles for operating the various described servo motors, solenoids and the like in predetermined manners in a sequence whereby selected of the multiple tools mounted on the turret are caused to operate in predetermined manners on work prepositioned in relation to the turret transfer and manipulation apparatus or track. In order to simplify the diagrams, it is assumed the power supply PS shown extending to the program controllers are gated by the controlled operation of switches in said controller to operate the forward and reverse controls of said motors in a sequence defined by reproduction of signals from the recording member of the controller. In other words, in FIGS. 12 and 13 the correct source of the electrical power is assumed to be provided on the correct sides of all controls, relays, switches, sensors and the like.

In FIG. 12 is shown a control diagram showing means for automatically controlling the apparatus illustrated in FIGS. 1 to 11 in a cycle of operation which may include the automatic control of the various servo motors associated with the track travelling carrier and depending fixture in order to preposition the turret relative to a workpiece or assembly as well as the motor rotating the turret and the various motors or solenoids operative to activate the tools and production devices mounted on said turret. The automatic controller or positional computer 23, which is illustrated in FIG. 1 as being mounted on the vertical column 17 of the tool manipulation apparatus, comprises a programmable device 23A such as a multi-circuit timer, tape or card reader. In FIG. 12 a program card 230 is shown being fed through the programming device 23A and has recordings or cutouts therein which are operative to open and close switches for gating a power supply PS to respective of the servo motors MX, MY, MZ, MR, MJ, etc. operating the tool positioning apparatus as well as the motor MT1 rotating the turret and the various other motors or solenoids which operate the tools mounted on the turret and are denoted MT2, MT3, MT4, etc. A further servo device MF is shown operatively controllable by the multi-circuit controller 23A and may comprise a motor or solenoid which is operative to gate or regulate a fluid to be dispensed from the turret and directed against a predetermined area of the work piece or one of the tools of the turret as it operates. Such a fluid may comprise a paint or coating fluid, lubricant, or the like. It may also comprise a blast of air directed to remove chips from the surface of the work or to perform other operations thereon.

Depending on how the programming device or recording is set up, one or more of the servo motors associated with either the turret fixtures or the turret itself including the devices mounted thereon, may be simultaneously operated to cause selected of the turret mounted tools to travel through predetermined paths relative to the work piece. In other words, the tool itself may be positioned relative to the work piece and then caused to operate while stationary or while projected from the stationary turret or the turret may be moved in a predetermined manner as the tool operates on the work piece by either controlled operation of the turret rotating motor and/or operation of one or more of the motors associated with the fixture on which the turret is mounted.

Starting of the program controller 23A may be effected by either manually activating the start control F of the constant speed motor MC driving the recording member through the housing of the controller or when a scanning relay 119 such as a limit switch, photoelectric detector or other sensing devices senses the presence of the work W, its holding fixture, or a marker defining its location. When the relay 119 becomes activated, if switch SW is closed, the start control F of motor MC is energized and the multi-circuit controller CA begins a cycle of operation which includes energizing and de-energizing the various outputs 23–1, 23–2, 23–3, etc. thereof which extend to the energizing inputs of the various servo motors illustrated, certain or all of which become activated in a predetermined sequence to provide prepositioning of the turret and predetermined control of the electrical devices mounted thereon.

One of the output circuits 23–12 of the multi-circuit controller 23A is shown connected to the stop control S of the recording drive motor MC so that when a cycle of operation has been completed the controller is automatically deactivated until the start input F of MC is next energized either by activation of the relay 119 or other means when the next work piece is in a predetermined position adjacent to the turret.

In FIG. 12, the mode of control is open loop, that is, all motors are controlled for predetermined time periods during a cycle to effect prepositioning of the turret tools and their predetermined operation. In FIG. 13, a closed loop control system is illustrated in part and may be combined with the open loop controller of FIG. 12 or utilized per se to effect control of one or more of the servo motors of the fixture and/or the turret. The controller 23' comprises a tape reading unit 23B or other form of recorder having a recording member therein with analog or digital signals recorded on a plurality of tracks with a reading head or pickup transducer operative to reproduce from each of said tracks and to provide an output signal or signals for controlling a respective of the servo motors associated with the fixture movement and/or the turret. A reference signal is thus developed on each of the outputs 120 in sequence and fed to an associated comparator device which receives a feed back signal proportional to the movement of the particular part or assembly controlled thereby or rotation of the motor moving said part or assembly. One of the outputs 120–3 is illustrated as extending to a comparator device 121 having a second input 126 on which a feedback signal is generated by means of a response potentiometer or tackometer 124 coupled to the output shaft 123S of the motor 123 controlled thereby. The comparator 121 provides a difference signal on its output 122 which is the difference between the two input signals and is operative to control the motor 123 for performing one of the described operations. Closed loop control is thus attained for the motor 123 and similar apparatus may be utilized for any of the other servo motors to effect precise positioning thereof in a predetermined cycle of operation to preform predetermined operations on or relative to the work piece. Further details of such an apparatus employing a reference signal generating means, a feedback signal generating means, a comparator device for generating a difference signal, etc. may be found in my previous application Serial Number 477,467 as well as in U.S. Patents 2,475,245 and 3,069,608.

Figure 14:
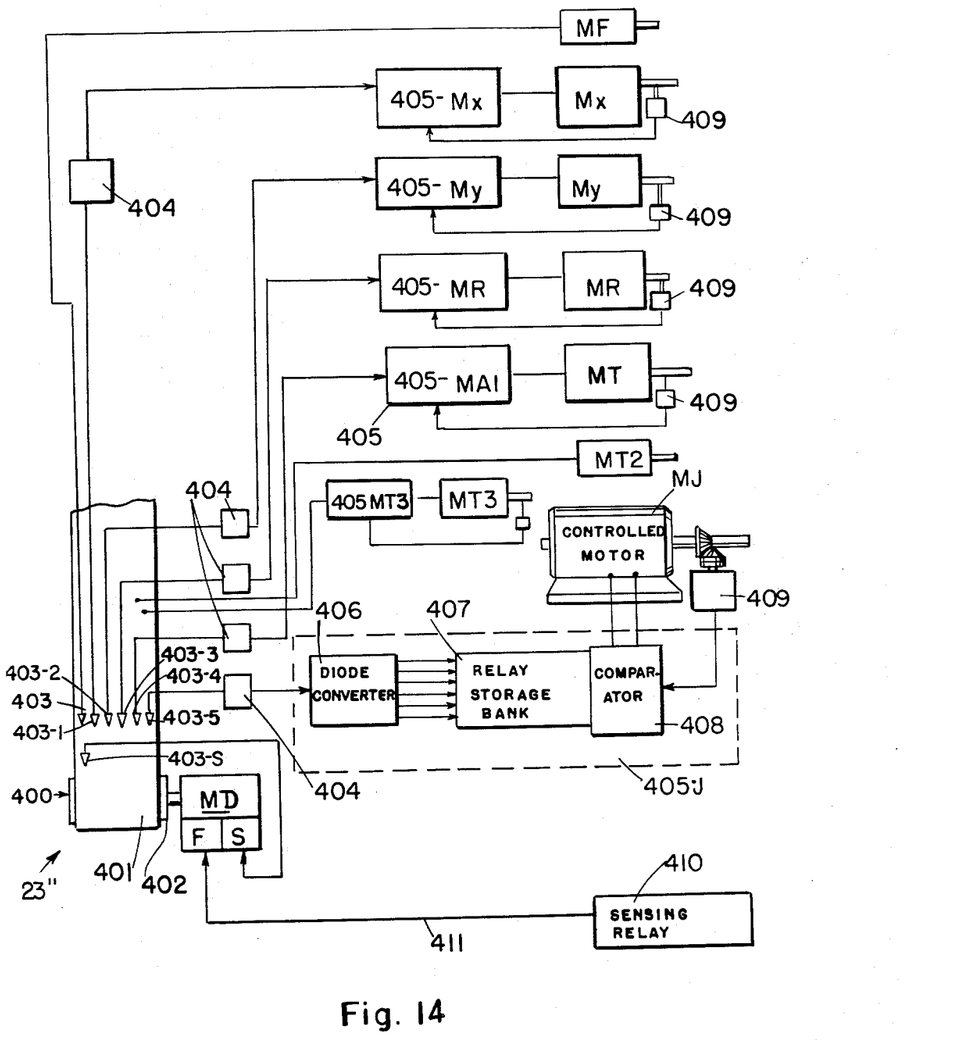
FIG. 14 is a circuit diagram showing further details of the pre-programmed automatic controller.

Referring more specifically to the disclosure of my application Serial No. 477,467, the pre-programmed control means for selectively actuating the various servo driven power means may typically include components of the type shown in FIG. 14. The control means or positional computer 23″ derives command signals by reproducing digital command recordings from a magnetic or punched tape 401. Tape 401 is driven in a predetermined path, and is preferably provided a closed loop formation of said tape driven about a tape transport referred to by the general notation 400 and including a drive wheel or sprocket 402 which is rotated at constant speed by means of a tape drive motor MD having forward drive controls F and S. A bank of reproduction heads 403 is operatively coupled to reproduce the pulse codes recorded on the tape 401, each of which heads is operatively connected to the input of a respective converter controller 405 which controls the operation of a respective servo motor. Reproduction transducer 403–1, for example is operatively connected through a reproduction amplifier 404 to a control circuit 405–Mx which is operative in response to the train of pulses reproduced by 403–1 to control the motor Mx to operate in a predetermined manner to effect positioning of the entire manipulator 10 along the overhead trackway 20 relative to a particular work area spatial volume. Similarly reproduction head 403–2 is operatively connected through its reproduction amplifier to the input of a control circuit 405–My which is operative to control the motor My in a predetermined manner as commanded by the signals reproduced by 403–2 from the closed loop tape 401. The other servo mtors illustrated which are operatively controlled by signals reproduced by respective reproduction heads of the bank 403, control the actuating of their respective motors, the functions of which have been previously discussed.

The controller 405–J is illustrated in further detail. It is assumed that the other controllers having the servo notations preceded by the numerical notation 405– are similar in construction to 405–J. The binary code pulse output of the reproduction head 403–5 is first passed to a series to parallel diode converter 406 where each code command is converted to a parallel code which code is transmitted to a relay storage bank 407 containing precision resistors. The contacts of the storage unit relays set up the resistance bank in 407 so that the resistance is proportional to the digital information recorded on the tape 101. Thus the relay storage introduces a resistance proportional to the numerical value of the signals reproduced from the tape into a self-balancing bridge which forms part of a comparator device 408. A feed back signal is generated during the operation of the servo motor MJ being controlled by means of a response potentiometer 409 which is coupled to the shaft of the control motor and provides an error signal at the output of the comparator 408 which is used to control the operation of said motor until the bridge is balanced or a null condition exists whereupon the motor will stop when arm 19 is pivoted the predetermined desired amount about axis 18. The position of the command signals recorded on the tape 401 will determine just when the arm 19 pivots in a cycle of operation and will similarly provide effective control for the other servos of the manipulator to control movement of the various components or assemblies, by providing binary code command signals at the inputs of each of the control circuits 405 of each of the motors.

It is noted that the tape drive motor MT may be operated continuously to provide automatic recycle operation of the manipulator if the articles to be operated upon are continuously fed to a predetermined spatial location and determined by, for example, the end of a chute or conveyer or by movement along a conveyer adjacent the manipulator assembly. Recycling may also be effected by providing means for sensing the surface of the work whereby the sensing means provides a pulse signal for energizing the start control F of motor MT which motor has been previously stopped by energization of the stop control S thereof. The stop control S of MT may be energized, for example, by reproduction of a signal from a further channel of the tape 401 at the end of the cycle.

It is noted that the arrangement of servo motors illustrated in FIG. 14 is only illustrative and that variations in the number and type of said servos will be provided in accordance with variations in both the physical arrangement of manipulator components and servos operative to drive said components. For example, the motor Mx may be eliminated from the control cycle if the manipulator apparatus is manually prepositioned relative to a predetermined spatial location. Similarly, any of the other servo motors may be eliminated or may be multiplied in number depending on the particular physical arrangement of manipulator arms, rotatable assemblies and columns. Notation 410 in FIG. 12 refers to a sensing relay, preferably mounted on the manipulator in a position to sense the presence of an article or assembly immediately adjacent said manipulator. In FIG. 1, the sensing relay (shown as 127) is illustrated as a photoelectric cell mounted on the turret. The output 411 of the sensing relay 410 is operatively connected to the start control F of motor MT to transmit a pulse thereto to effect recycling of the tape 401 when said sensing relay becomes energized upon sensing the surface of an article or assembly in alignment with the manipulator. The relay 410 may comprise any type of suitable sensor capable of generating an output signal when scanning the surface of the work or fixture in the immediate vicinity of said device and may comprise a photoelectric cell with or without a light source immediately adjacent thereto for beaming light against the surface to be sensed which is reflected thereby back to the cell, and infra-red detector for detecting the surface of the work, a limit switch operative to generate an output signal upon contact with the surface of the article or assembly, an electro magnetic or other type of proximity switch, etc. Notation 403–S refers to a pick up head operatively connected to a sixth channel of the tape 401 for reproducing a stop-signal recorded at the end of the cycle recordings which is transmitted to energize the stop control S of motor MT which stops until the start control F is energized upon activation or energization of the sensing relay 410. Power supplies are not illustrated in FIG. 14 for the purpose of simplifying the diagram and it is assumed that they are provided on the correct sides of all relays, amplifiers and other circuits.

Further details of the control apparatus illustrated in FIG. 13 include a scanning relay 119′ mounted on the carrier or turret for sensing a surface of the work, its holding fixture or a marker provided thereon and for generating a cycle initiating signal on an output extending to the start control F of the drive motor MC′ for the tape or other recording member provided in the record playback device 23B. A switch SW is also provided to permit initiation of the automatic cycle of operation by manual or other means.

Also shown in FIG. 13 are components operative to activate one or more servo operated devices associated with clamping or retaining the work or the fixtures illustrated in FIG. 1 for clamping or otherwise retaining the turret retaining assembly. The clamping device 129 is shown as that provided in FIG. 1 for retaining and releasing the work W although the control means illustrated may be multiplied in number or operative for activating retaining devices for the turret, carrier or tool.

Notation 127 refers to a light source mounted on the fixture or turret and operative when positioned in line with a photoelectric relay and control 28, shown in FIG. 1 as mounted directly on the servo 129. The light source 127 is thus positioned and/or activated under the control of the multi-circuit controller 23B in the predetermined sequence necessary to operate the product or work clamping servo 129 in a manner to release a unit of work permitting it to be carried away from the work station upon completion of the operations performed by the turret mounted devices. In a similar manner, the same or other controlled light sources mounted on the carrier or turret may also be utilized to activate photoelectric relays which are operative for energizing the servos associated with the clamping fixtures.

An interlock may be provided between the controllers 23A and 23B of FIGS. 12 and 13 whereby the open loop controller 23A is operative to effect broad control of the fixture positioning servos and/or any of the servos associated with the turret and the closed loop controller 23' is operative to effect more precise control of certain of the other servos such as the turret rotating motor and/or any of the other tools or devices mounted thereon. Such an interlock is effected, for example, by connecting an output 23A' of the multi-circuit controller 23A to the start control F of tape drive motor MC' so that the controller 23A may be operative to initiate a programmed cycle as recorded in 23B. Similarly, the controller 23' may be interlocked with 23 so that when a cycle as controlled by 23B is terminated or has reached a predetermined phase in its operation, the entire cycle generated by 23A or a predetermined portion thereof may be reinstituted. An output 23B' of recording playback unit 23B is shown connected to the start control F of constant speedmotor MC driving the recording unit through 23A. By recording on selected channels of the recording members driven through playback units 23A and 23B, open loop control of certain of the servo motors may be effected while closed loop control of others may be utilized to derive more precise positioning or operation of the various turret mounted tools and devices.

It is assumed that the various electrical servo motors, solenoids and the like described hereinabove and illustrated, for example, in FIG. 12, terminate or are operatively connected to the output circuits 120 of controller 23' of FIG. 13 on which are generated said control signals. In FIG. 12 an output 23–15 of controller 23 is shown extending to the mono-stable solenoid 15 or clamping device illustrated in FIG. 1 as being utilized to clampingly retain the manipulator fixture in the position along the guideway 20 to which it is driven by the controller operated motor 14. One or more similarly operated and controlled clamping devices designated by the general notation MTC may also be operatively controlled in sequence by the controller 23 to clampingly or otherwise retain any of the illustrated rotatable and/or lineally movable components or assemblies in fixed relation to the adjacent components or assemblies of the tool 10 by the use of solenoids or motors to effect engagement of a part secured to one component with a surface of the other. The turret 58 may be so restricted or retained in a selected position relative to its base 51 or any of the tools mounted on said turret may also be clampingly engaged in position under the control of the positional computers 23 or 23' by the sequential generation of control or operating signals on the lines leading to said servo motors or solenoids.

I claim:

1. In an automatic machine tool for selectively performing pre-programmed operations upon a work-piece: a manipulator fixture including first and second arm members extending from a base support member, said arm members secured to each other at the near ends thereof, the opposed end of said first arm member mounted to said base support member, a work operating turret mounted to the opposed end of said second arm member, first power means for controlling linear movement of said fixture in a first direction along the length of said first arm member, second power means for controlling linear movement of said fixture in a second direction along the length of said second arm member, and third power means for controlling rotational movement of said fixture in a third direction about a rotational axis, pre-programmed control means for selectively actuating said first, second and third power means, such that said work operating turret is program directed in said first, second and third directions to a desired work station.

2. In an automatic machine tool as set forth in claim 1, said first arm member extending outward of said base support member in a generally vertical direction, said second arm member laterally extending from said first arm means in a generally horizontal direction, said first power means adjusting the length of said first arm along a first axis extending in said substantially vertical direction for selectively controlling the vertical displacement of said turret from said base support member, said second power means adjusting the length of said second arm along a second axis extending in said substantially horizontal direction for selectively controlling the lateral displacement of said turret from said first axis, said third power means adjustably rotating said first arm member about said first axis for selectively controlling the azimuth position of said turret.

3. In an automatic machine tool as set forth in claim 1, said turret rotatably mounted about the opposed end of said second arm, a plurailty of work engaging means supported by said turret at different angular positions thereof, indexing means for selectively rotating said turret such that a predetermined one of said work engaging means will operate upon a workpiece at the pre-programmed location of said manipulator fixture.

4. In an automatic machine tool as set forth in claim 2, said turret rotatably mounted about the opposed end of said second arm, a plurality of work engaging means supported by said turret at different angular positions thereof, indexing means for selectively rotating said turret such that a predetermined one of said work engaging means will operate upon a work-piece at the pre-programmed location of said manipulator fixture.

5. In an automatic machine tool as set forth in claim 4, at least one of said work engaging means including a set of jaws operable to grasp a work-piece.

6. In an automatic machine tool as set forth in claim 4, said pre-programmed control means including servo motor control means for positioned control of said first, second and third control means, such that the vertical, horizontal and azimuth position of said turret is controlled thereby, and a variable programming means coupled to said pre-programmed control means for selectively varying the controlled movement of said fixture.

7. In an automatic machine tool as set forth in claim 6, said servo motor control means having a positional control feedback path including a light sensitive transducer means, said light sensitive transducer means including a light source carried by said turret, and cooperating light responsive means positioned to generate a feedback signal when the turret is positioned at a predetermined location.

8. In an automatic machine tool as set forth in claim 6, said pre-programmed controls including sequential control signals for sequentially cycling said turret to a plurality of work stations.

9. In an automatic production machine for selectively performing pre-programmed operations upon a work piece:
a fixture including a plurality of interconnected arm members extending from a base support member, with one end of said interconnected arm member mounted to said base support member, and the opposed end of said interconnected arm members carrying a work operating turret;
the near ends at least one of the adjacent interconnected arm members including a pivot joint for allowing rotational pivoting of one of such adjacent arm members relative to the other arm member;
said work operating turret carrying a plurality of tools mounted at different locations thereof, and power means for drivingly operating individual ones of said tools;

arm drive power means for controlling movement of said arm members, including said pivot joint, such that said work operating turret is positioned adjacent the work piece;

pre-programmed control means for selectively actuating said power means such that said work operating turret is program directed through a predetermined path, adjacent the workpiece, and a preselectively determined one of said tools is actuated by the power means carried by said turret;

power coupling means between the power means carried by said turret and said base support, said power coupling means including a rotary coupling means through said pivot joint.

10. In an automatic production machine as set forth in claim 9:

said turret tool power means comprising electrical servo means;

said rotary coupling means including rotary electrical coupling means, individually coupling to the individual servo means for respective ones of said tools;

said coupling means including a first array of conductors including plural flat strip electrical conductors carried by one of the adjacent arm member and insulated therefrom and a second array of a plurality of conductors mounted to the other arm member, said second array including plural brush elements positioned to make sliding contact with respective of said flat strip elements while the pivot joint rotates, the elements of one of said arrays of conductors being electrically connected to respective of said electric servos and the other array of conductors being electrically connected to respective controls for said servos.

11. In an automatic production machine as set forth in claim 10, in which said array of flat strip elements comprises a plurality of groups of separate elements mounted to said one arm each group comprising elements parallel to each other and concentrically arrayed with respect to the axis of rotation of said pivot joint with individual elements of one group disposed in substantially the same circular path as elements of adjacent groups but insulated therefrom whereby one brush element makes contact with different strip elements during the rotation of said pivot joint.

12. In an automatic production machine for selectively performing pre-programmed operations upon a work piece:

a fixture comprising a base, means rotatively mounted by said base and including a work operating turret;

first power means for rotating said turret relative to the work piece;

said work operating turret carrying at least a first and second power operated tool mounted at different locations theerof, and first and second turret power means for individually operating individual ones of said power tools;

pre-programmed control means for selectively actuating said power means such that said work operating turret is program directed through a predetermined path, adjacent the workpiece, and a preselectively determined one of said power tools is individually operated by the individual power means therefor carried by said turret;

power coupling means between the power means carried by said turret and said base support, said power coupling means including a rotary coupling means through the rotational support of said fixture for selectively coupling power between said base and preselectively determined ones of said first and second turret power means.

13. In an automatic production machine as set forth in claim 12:

said turret tool power means comprising electrical servo means;

said rotary coupling means including rotary electrical coupling means, individually coupling to the individual servo means for respective ones of said tools;

said coupling means including a first array of conductors including plural flat strip electrical conductors carried by one of the relatively moveable members of the rotational support and insulated therefrom and a second array of a plurality of conductors mounted to the other of the relatively moveable members of the rotational support, said second array including plural brush elements position to make sliding contact with respective of said flat strip elements while the rotational support rotates; the elements of one of said arrays of conductors being electrically connected to respective of said electric servos and the other array of conductors being electrically connected to respective controls for said servos.

14. In an automatic production machine as set forth in claim 13, in which said array of flat strip elements comprises a plurality of groups of separate elements mounted to said one member each group comprising elements parallel to each other and concentrically arrayed with respect to the axis of rotation of said rotational support with individual elements of one group disposed in substantially the same circular path as elements of adjacent groups but insulated therefrom whereby one brush element makes contact with different strip elements during the rotation of said rotational joint.

15. In an automatic machine tool for selectively performing pre-programmed operations upon a work-piece positioned as a work station:

(a) a base support member;
(b) a manipulation fixture having opposed first and second ends;
(c) said first end mounted to said base support member;
(d) a turret rotationally mounted to said second end;
(e) a plurality of tools supported by said turret at different angular positions thereof;
(f) first power means for controlling movement of said manipulation fixture along a predeterminedly programmed path such that said turret is variable in altitude with respect to the horizontal;
(g) second power means for rotating said turret;
(h) pre-programmed control means for selectively actuating said first and second power means, such that said turret is program directed along said predeterminedly programmed path, to a desired work station, and said turret is predeterminedly rotatable to position a selected turret mounted tool relative to the work-piece, and perform a predetermined operation on the workpiece.

16. In an automatic machine tool as set forth in claim 15, electrical servo means mounted on said turret for driving said selected tool;

rotary electrical coupling means between said turret and manipulation fixture;

said pre-programmed control means further including means, circuit connected through said rotary electrical coupling means, to said electrical servo means, to controllingly drive said selected tool through a predetermined operation upon the work-piece.

17. In an automatic machine tool as set forth in claim 15, at least one of said turret mounted tools including a set of jaw means for seizing and releasing the workpiece, to effect the seizure, transfer and release of articles from said work support.

18. In an automatic machine tool for selectively performing at least one of a pre-programmed plurality of operations upon a work-piece positioned in a work support:

(a) a base member;

(b) a fixture movably supported on said base member;
(c) a turret rotationally mounted on said fixture;
(d) a plurality of tools supported by said turret at different angular positions thereof;
(e) first power means for moving and prepositioning said fixture relative to said base member, such that said fixture is positionable adjacent the work-piece;
(f) second power means for rotating said turret about an axis of rotation;
(g) third power means for rotating said turret on said fixture, about an axis transverse to said axis of turret rotation;
(h) pre-programmed control means for selectively actuating said first power means and operative to preposition said fixture relative said base, and operative upon prepositioning said fixture relative said base for actuating said second and third power means to cause predetermined rotation and pivoting of said turret on said fixture for prepositioning a selected turret mounted tool relative to a work-piece and also operable to control said tool thereafter for performing a predetermined operation on a work-piece.

19. In an automatic machine tool for selectively performing pre-programmed operations upon a work-piece: a manipulator fixture including first and second arm members extending from a base support member, said arm members secured to each other at the near ends thereof, the opposed end of said first arm member mounted to said base support member, a rotatable turret mounted to the opposed end of said second arm member and carrying a plurality of work operating tools at different angular locations thereof, first power means for controlling linear movement of said fixture in a first direction along the length of said first arm member, second power means for controlling linear movement of said fixture in a second direction along the length of said second arm member, and third power means for controlling rotational movement of said turret, pre-programmed control means for selectively actuating said first, second and third power means, such that said work operating turret is program directed in said first and second directions to a desired work station, and a preselected operating tool is rotated in operating position adjacent the work-piece.

No references cited.

RICHARD H. EANES, Jr., *Primary Examiner.*